United States Patent [19]

Grant et al.

[11] Patent Number: 4,731,982

[45] Date of Patent: Mar. 22, 1988

[54] GAS LINE SEALING METHOD UTILIZING PENETRATING FLEXIBLE SEALANT

[75] Inventors: Seamus M. Grant, Dublin, Ireland; Bernard Cooke, London, England; Kieran Mulcahy, Kildare, Ireland

[73] Assignee: Loctite Ltd., Dublin, Ireland

[21] Appl. No.: 732,659

[22] Filed: May 10, 1985

[30] Foreign Application Priority Data

May 15, 1984 [GB] United Kingdom ............... 8412354

[51] Int. Cl.$^4$ .............................................. B32B 35/00
[52] U.S. Cl. ..................................... 156/94; 106/33; 138/97; 156/327; 156/332; 264/36; 285/15; 526/135; 526/318.42; 526/318.43; 526/318.44
[58] Field of Search ........................ 156/94, 332, 327; 526/135, 317; 285/15; 264/36; 106/33; 138/97

[56] References Cited

U.S. PATENT DOCUMENTS

| | | |
|---|---|---|
| 2,642,410 | 6/1953 | Hoppens ............................ 526/135 |
| 3,238,973 | 3/1966 | Roach ................................. 138/97 |
| 3,661,876 | 5/1972 | Wegemund et al. ................ 156/327 |
| 3,736,260 | 5/1973 | O'Sullivan et al. ................ 156/332 |
| 4,054,480 | 10/1977 | Skoultchi et al. .................. 156/332 |
| 4,439,600 | 3/1984 | Moran ................................ 528/392 |
| 4,582,551 | 4/1986 | Parkes et al. ........................ 156/94 |

*Primary Examiner*—John J. Gallagher
*Attorney, Agent, or Firm*—Eugene F. Miller; Walter J. Steinkraus; Edward K. Welch, II

[57] ABSTRACT

A method of sealing leaking gas pipe joints by injecting a catalyzed acrylic monomer composition into the leaking joint and curing the composition in the joint to seal the leak is characterized in that the composition when cured has a glass transition temperature which is no more than 0° C. and is at least about 5° C. below the minimum pipe joint operating temperature. Suitable sealants are mixture of long chain monoacrylic esters, hydroxy functional acrylic esters, acid monomers, plasticizers and polyfunctional acrylic esters.

18 Claims, No Drawings

GAS LINE SEALING METHOD UTILIZING PENETRATING FLEXIBLE SEALANT

BACKGROUND OF THE INVENTION

Leakage of fuel gas from pipelines is a serious problem. In U.S. Pat. No. 4,304,805 there is described a process for sealing leaks in buried gas pipes by polymerization of volatilized amino-silane monomers. This same reference discusses other prior art methods for sealing gas pipes and includes the following statement:

In U.S. Pat. No. 3,507,725 to Hylak et al., there is disclosed a method of repairing gas main fibrous packed joints with a liquid sealing material which may be a liquid monomer such as styrene monomer, by introducing the monomer into the gas main in liquid form, and permitting it to flow to a low point in the system where a leaking joint exists, the packing of which becomes saturated with the sealant which then polymerizes over a relatively long period of time, namely six weeks to three months. Styrene is employed as a liquid, and no specific catalyst is named in the patent.

Recently there has been developed an apparatus for sealing gas pipe leaks which includes means for moving the apparatus through a pipeline to a leak site, inflatable elongated balloon or bladder means having three separate adjacent inflatable chambers, means for selectively inflating and deflating the respective chambers, and means for injecting a curable sealant fluid between the center balloon chamber and the inner pipe wall. The apparatus is operated so as to position the central balloon chamber at a leak, inflate the two outer balloon chambers so as to enclose a central leak containing area within the pipe, inject the curable sealant into the enclosed area and then inflate the central balloon chamber to move the fluid into the porosities causing the leak where the fluid is cured. The apparatus is removed after deflation of the balloon chambers. It has been proposed to use an anaerobic sealant in this process since such sealants have a property, convenient for this application, of being stable on exposure to air but readily and spontaneously curing upon deprivation of oxygen. It has been found however that the anaerobic sealants designed for impregnating rigid articles may not be suitable for sealing leaking gas pipe joints because such sealants produce rigid cured products which are not sufficiently flexible to accommodate the relative movement which underground gas pipes undergo due to gradually applied stresses from soil settling, changes in water table, road vibrations, etc. Thus, an improved anaerobic sealant suitable for sealing leaks in underground gas pipes is desirable.

DESCRIPTION OF THE INVENTION

The present invention uses a novel low viscosity wicking acrylic sealant which readily cures to a flexible solid capable of withstanding substantial movement between substrates. While heat cure or other catalyst systems may be usefully employed, the sealant is preferably catalyzed with an anaerobic type catalyst system. The inventive sealants are mixtures of long chain monoacrylic esters such as 2-ethylhexyl methacrylate, tridecyl methacrylate, stearyl methacrylate and lauryl methacrylate; hydroxy functional acrylic esters such as hydroxypropyl methacrylate and hydroxyethyl methacrylate, acid monomers such as acrylic and methacrylic acids, plasticizers such as tetraethylene glycol di(2-ethyl)hexanoate, polyfunctional acrylic esters such as trimethylolpropane trimethacrylate, stabilizers and catalysts.

The inventive sealants must give a cured product having a glass transition temperature (Tg) of no more than 0° C. and the Tg must be at least about 5° C. below the minimum pipe joint operating temperature. Preferably the Tg is at least 20° C. below the minimum joint temperature.

The viscosity of the composition is preferably no greater than 100 cps. Suitably the viscosity is less than 50 cps.

The quantities of the respective ingredients are selected to optimize the viscosity, wetting and cure speed of the uncured product while maintaining the requisite cured Tg. Suitable ranges are:
(a) long chain acrylic ester: 20–80%
(b) hydroxy functional acrylic ester: 15–50%
(c) acid monomer: 0.5–5%
(d) plasticizer: 5–30%
(e) polyfunctional acrylic ester: 0.1–5%

Preferred ranges are (a) 50–65; (b) 20–30; (c) 2–4; (d) 10–20 and (e) 0.5–1.5.

The plasticizer is most preferably a low viscosity liquid ester. Soluble rubbers may also be suitable if sufficient plasticization of the cured composition can be achieved at rubber concentrations which do not adversely affect viscosity of the uncured compositions.

EXAMPLE 1

An example of such a sealant is given below.

| Ingredients | Parts By Weight |
| --- | --- |
| 2-ethylhexyl methacrylate | 56 |
| hydroxypropyl methacrylate | 27 |
| acrylic acid | 2.5 |
| tetraethylene glycol di-2-ethylhexanoate | 14 |
| trimethylolpropane trimethacrylate | 1 |
| 5% p-benzoquinone in polyethylene glycol dimethacrylate | 0.05 |
| 9% NaEDTA in ethylene glycol/$H_2O$ | 0.03 |
| cumene hydroperoxide | 1.52 |
| N—N—dihydroxyethyl-p-toluidine | 0.9 |
| copper saccharin salt | 0.06 |

Bulk aeration of this sealant is necessary in order to prevent polymerization. Thus, it is recommended that in applications where aeration is unfeasible, a portion of the catalyst system, e.g. the copper saccharin salt, be separately added only shortly before use. Conveniently the copper saccharin salt may be added as a separate solution in a portion of some or all of the monomer base. Alternatively the copper saccharin salt may be added as a solution in a suitable solvent such as ethylene glycol, propylene glycol, triethanol amine, or N-methylpyrrolidone.

The above exemplified sealant has a viscosity of about 5 cps. Typical cured properties after a 24-hour cure at 23° C. are as follows:
Tensile strength: 30 Kg/$cm^2$
Percent elongation at break: 300%
Hardness, Shore A: 80
Tg: −20° C.
Tear resistance: 15 N/mm The catalyzed sealant may be applied to pipe joints by any suitable positive pressure system. It is particularly suited for use as the sealant with the three chambered inflatable device discussed above. Once in the joint, the sealant cures rapidly and will unitize any corrosion scale present to form a leak proof seal. This sealant may also be applied to porous components using either positive pressure or vacuum systems.

Depending on desired cure speed, the hydroperoxide level may be varied between about 0.1% and about 5% and the copper saccharin level may be varied between about 0.01% and 3% without materially affecting the cured properties obtained.

While an anaerobic curing sealant as exemplified above is preferred for underground pipe joint applications, in other applications other catalyst systems may be employed. Other suitable anaerobic cure systems are described, for example, in U.S. Pat. Nos. 3,855,040 to Malofsky, 4,180,640 to Melody et al. and 4,321,349 to Rich. Benzoyl peroxide/amine cure systems may also be employed.

EXAMPLE 2

A formulation was prepared as in the previous example except that only 24 parts of hydroxypropyl methacrylate was used, 0.1 parts saccharin was added and copper saccharin salt eliminated. Just prior to curing, a catalyst mixture comprising 12.5 parts of an 8% copper naphthanate solution and 87.5% of tetraethylene glycol di-2-ethylhexanoate is added. Cures were obtained at ambient temperatures unless otherwise stated. Cured products were prepared, evaluated, and the results obtained as set forth in Tables I-III. Dogbone specimens were utilized, prepared from cured sheets per ASTM D638 using a type IV die.

TABLE I

Effect of strain rate.
2% Catalyst, 7 day Cure. Tested at 23° C.

| Strain Rate mm/min. | Breaking Strength Kg/cm$^2$ | % Elongation at break |
| --- | --- | --- |
| 10 | 14.5 | 260 |
| 100 | 29.9 | 251 |
| 1000 | 42.8 | 220 |

TABLE II

Effect of catalyst added.
Specimens cured at 23° C.
Tested at 100 mm/min.

| | Breaking Strength/% Elongation at Break | | | Tg. °C. | Youngs Modulus Kg/cm$^2$ | | |
| --- | --- | --- | --- | --- | --- | --- | --- |
| % Catalyst | 1 Day | 2 Days | 7 Days | | −13° C. | 18° C. | 37° C. |
| 1 | 22.3/364 | — | — | −32 | 9400 | 53 | 47 |
| 2 | 19.6/350 | 23.2/402 | 29.9/251 | −32 | 8750 | 68 | 51 |
| 3 | 18.2/384 | — | — | −34 | 5350 | 58 | 43 |

TABLE III

EFFECT OF SOLVENT IMMERSION

| 2% Catalyst. 3 HOUR CURED SPECIMENS Solvent | 1 Day | 2 Days | 7 Days | 14 Days | 21 Days | 7 DAY CURED SPECIMENS 14 Days |
| --- | --- | --- | --- | --- | --- | --- |
| Shell Carnea ™ 21 | | | | | | |
| Break Kg/cm$^2$ | 19 | 22 | 23 | 28 | 28 | 30 |
| % Elong. at break | 274 | 238 | 274 | 242 | 262 | 253 |
| Ethylene glycol | | | | | | |
| Break Kg/cm$^2$ | 22 | 24 | 24 | 19 | 18 | 24 |
| % Elong. at break | 279 | 267 | 203 | 288 | 284 | 267 |
| Tap Water | | | | | | |
| Break Kg/cm$^2$ | 15 | 16 | 24 | 22 | 24 | 23 |
| % Elong. at break | 238 | 250 | 269 | 274 | 262 | 255 |

An alternate procedure to that described in the background section above, for sealing leaking joints in cast iron pipes with lead/yarn joints, developed subsequently to the priority date of this application, is as follows. A hole is drilled through the lead into the joint packing, and a short rigid nipple, such as a piece of metal tubing, is pounded into the hole. A length of flexible plastic tubing used to connect the nipple to a reservoir of anaerobic sealant. The sealant is then pumped into the joint and the plastic tubing clamped off and cut above the clamp. Gas pressure in the cast iron pipe drives the injected sealant into the leak paths. The sealant cures anaerobically in the leak path and in the nipple and plastic tubing section. A conventional nitrogen cylinder with 2-stage pressure regulator has been found to be a convenient means for pumping sealant into the joint. Further description of this method is believed to be reported in U.K. patent application No. 84,14544. This alternate method was used to conduct sealant trials on 6 inch diameter cast iron pipe sections.

The joints were prepared by packing the annular ring with jute and poring molten lead on top to form a seal. These joints are pressurized with nitrogen at 3 psi and adjusted by relative movement of the pipe sections to give a leak rate of one liter per minute. Sealant trials were then conducted as set forth in Examples 3-6.

EXAMPLE 3

A product formulated as in Example 2 using 2% catalyst was injected at a joint temperature of 17° C. Leakage ceased and after injection of 500 grams of sealant, the injection tube was clamped off. After gellation of the sealant (40 minutes) the internal pressure was increased to 10 psi without further leakage being evident. Dismantling the joint showed good penetration and cure.

EXAMPLE 4

To a formulation as in Example 2 was added 18% of a polyester thickener sold under the trandmark Atlac TM 382E. The product had a viscosity of 80 cps. This product was catalyzed by addition of 2% of the catalyst mixture. The joint temperature was 20° C. 500 cc of this product was injected at 1-2 bar pressure over 18 minutes. Leaking was successfully stopped t throughout the injection period and did not re-establish. Product gelled at 38 minutes and the leaks remained sealed after the gel time. Dismantling the joint showed good even penetration and total cure of injected product.

EXAMPLE 5

The formulation of Example 2 was modified by addition of 0.5% fumed silica. 500 cc's of this modified product, catalyzed with 2% catalyst, was injected at a joint temperature of 18° C. and a pressure of 1-4 over a 20 minute period after which the injection tube was clamped. Leaking stopped 10 minutes after injection began and did not re-establish.

EXAMPLE 6

A product identical to that used in Example 5 was injected into a joint at 0° C. using 1-3 bar. An identical sealing pattern was obtained to that in Example 5.

As can be seen from Examples 4-6, polymeric thickeners or silicas may be added to the formulation if desired, so long as flexibility is not impaired and the viscosity is not increased to the point where injection into the joint is impaired. Preferably, silicas are utilized at a level of 0.3-2%. Still more preferably, 0.3-1.0%, which is a range in which the silica does not impart substantial thixotropy and yet provides significant sealing benefits especially at low temperatures (i.e., near 0° C.).

We claim:

1. In a method comprising injecting a catalyzed acrylic monomer composition into a leaking pipe joint and curing the composition in the joint to seal the leaks, the improvement comprising that the composition when cured has a glass transition temperature (Tg) which is not more than 0° C. and is a least about 5° below the minimum operating temperature of the pipe joint, and the composition has a viscosity no greater than 100 cps.

2. The method of claim 1 wherein the composition when cured has a Tg of no more than −20° C.

3. In a method comprising injecting a catalyzed acrylic monomer composition into a leaking pipe joint and curing the composition in the joint to seal the leaks, the improvement comprising that the composition when cured has a glass transition temperature (Tg) which is not more than 0° C. and is at least about 5° below the minumum operating temperature of the pipe joint, and the composition comprises:
 (a) 20–80% of a long chain acrylic ester;
 (b) 15–50% of a hydroxy functional acrylic ester;
 (c) 0.5–5% of a acid monomer;
 (d) 5–30% of a plasticizer;
 (e) 0.1–5% of a polyfunctional acrylic ester.

4. The method of claim 3 wherein the long chain acrylic ester is selected from 2-ethylhexyl methacrylate, tridecyl methacrylate, stearyl methacrylate and lauryl methacrylate; the hydroxy functional acrylic ester is selected from hydroxy propyl methacrylate and hydroxyethyl methacrylate; the acid monomer is selected from acrylic and methacrylic acids; and the plasticizer is selected from low viscosity liquid esters and soluble rubbers.

5. The method of claim 4 wherein the polyfunctional acrylic ester is trimethylolpropane trimethacrylate.

6. The method of claim 5 wherein the percentage ranges are (a) 50–65%; (b) 20–30%; (c) 2–4%; (d) 10–20%; and, (e) 0.5–1.5%.

7. The method of claim 3 wherein the composition has a viscosity no greater than 100 cps.

8. The method of claim 7 wherein the viscosity is less than 50 cps.

9. The method of claim 3 wherein the composition further comprises a hydroperoxide, said composition being catalyzed by addition of a copper salt.

10. The method of claim 9 where the copper salt is copper saccharin.

11. The method of claim 9 wherein the copper salt is copper naphthanate and the composition further comprises saccharin.

12. The method of claim 3 wherein the composition further comprises a silica in the amount of 0.3–2%.

13. The method of claim 12 wherein the silica is present in the range 0.3–1.0%.

14. A flexible penetrating sealant for sealing leaks in gas-line joints characterized in that the sealant has a viscosity low enough to be injected into a leaking gas-line joint and comprises a mixture of a long chain acrylic ester, a hydroxy functional acrylic ester, an acid monomer, a plasticizer and a polyfunctional acrylic ester, and has a glass transition temperature (Tg) which is no more than 0° C. and which is at least 5° C. below the minimum pipe joint operating temperature.

15. A sealant as in claim 14 characterized by a glass transition temperature at least 20° C. below the minimum pipe joint operating temperature.

16. A sealant as in claim 14 wherein the glass transition temperature is no more than −20° C.

17. A sealant as in claim 14 wherein the viscosity is no greater than 100 cps.

18. The sealant of claim 14 wherein the viscosity is less than 50 cps.

* * * * *